United States Patent [19]

Vanderwerf

[11] Patent Number: 4,900,129
[45] Date of Patent: Feb. 13, 1990

[54] DUAL GROOVED FRESNEL LENS FOR OVERHEAD PROJECTION

[75] Inventor: Dennis F. Vanderwerf, Cottage Grove, Minn.

[73] Assignee: Minnesota Mining and Manufacturing Company, St. Paul, Minn.

[21] Appl. No.: 285,531

[22] Filed: Dec. 16, 1988

[51] Int. Cl.⁴ .............................................. G02B 3/08
[52] U.S. Cl. .................................... 350/167; 350/452
[58] Field of Search ....................... 350/167, 451, 452

[56] References Cited

U.S. PATENT DOCUMENTS 4,044,889 8/1977 Orentreich et al. ................ 350/452

FOREIGN PATENT DOCUMENTS 57-109618 6/1982 Japan .

Primary Examiner—Bruce Y. Arnold
Assistant Examiner—Terry S. Callaghan
Attorney, Agent, or Firm—Donald M. Sell; Walter N. Kirn; David W. Anderson

[57] ABSTRACT

This invention consists of a Fresnel lens having focusing grooves on both sides of a single element. The relative frequencies of the grooved surfaces are controlled such that Moire fringe patterns between the two grooved surfaces are reduced. Specifically, the frequency of the Fresnel elements on one surface of the element is at least four times that of the Fresnel elements on the other surface and not a integral multiple thereof.

3 Claims, 1 Drawing Sheet

DUAL GROOVED FRESNEL LENS FOR OVERHEAD PROJECTION

FIELD OF THE INVENTION

The present invention relates generally to overhead projectors, and particularly to condensing lenses for such projectors.

BACKGROUND OF THE INVENTION

Conventional Fresnel lenses for use as condensers, concentrators, and field lenses usually are of the form of a single element with prismatic, circular grooves on one side and a planar surface on the other. When high transmission is required at a smaller f-number, for example in overhead projectors, two of this type are used together and are sealed together at the periphery. Since these lenses usually lie close to the imaging plane or stage of the projector, Moire Interference patterns can appear on the projected image when the centers of the circular groove structures are not coincident to a certain tolerance.

A single element Fresnel lens with identical groove structures on both sides is described in Japanese patent No. 57-109618. In that patent, two identical dies are replicated from the same groove structure and are very accurately aligned in a fixture using guide posts. The lens is formed by pouring a thermoplastic resin between the dies and subsequently applying heat and pressure.

Such a dual-element lens is economically advantageous over the conventional two lens arrangement since only one sheet of lens material is necessary. Unfortunately, the requirement that the center of the grooved surfaces be aligned to a close tolerance increases the expense of a workable dual-element lens, and therefore somewhat offsets its advantages.

It is desired to reduce the cost of manufacturing a workable dual-element lens by eliminating or easing the requirement for highly accurate center alignment of the grooved elements on each side of the lens.

SUMMARY OF THE INVENTION

The current invention produces a single element, dual-grooved Fresnel lens from non-identical groove structures, using conventional compression molding techniques. The groove angles are designed to maximize light transmission, while the groove frequencies of each surface are carefully controlled to reduce the need for accurate center alignment to eliminate Moire patterns.

This invention consists of a high transmission, low f-number single element dual-grooved Fresnel lens. The opposing groove structures are designed for high light transmission, and the groove frequency ratio between the two surfaces is chosen to minimize the production of Moire fringe patterns, even if the two stamping dies are not accurately center-aligned during molding of the lens.

Specifically, the invention is an improved dual-grooved Fresnel lens wherein a single sheet of lens material includes grooved Fresnel elements on each major surface, and the groove frequency of the Fresnel elements on one major surface of said lens is at least four times the groove frequency of the Fresnel elements on the other major surface of said lens and not an integral multiple of the groove frequency of the Fresnel elements on the other major surface, whereby Moire fringes are reduced.

In the preferred embodiment of the invention, the groove frequency of said Fresnel elements on one major surface is about 4.74 times the groove frequency of the groove frequency of the Fresnel elements on the other major surface.

BRIEF DESCRIPTION OF THE DRAWINGS

The present invention will be more thoroughly described with respect to the accompanying drawing, wherein like numbers refer to like parts in the several views, and wherein.

DETAILED DESCRIPTION OF THE INVENTION

Figure 1:
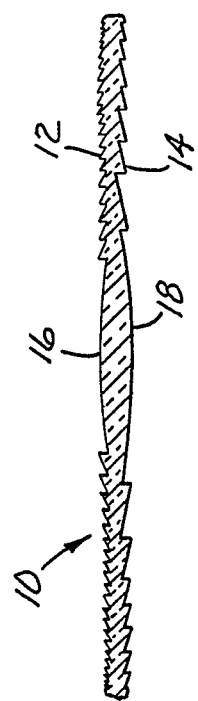
FIG. 1 is a cross-section view of a dual-grooved Fresnel lens according to the present invention.

FIG. 1 shows a dual-grooved Fresnel lens, generally indicated as 10, of the current invention. The term "dual-groove" refers to the fact that the lens 10 is molded from a single sheet of material with circular Fresnel elements 12 and 14 molded into each major surface of the sheet. In conventional dual-grooved lenses, it is important to the elimination or reduction of Moire fringes that the centers 16 and 18 of the circular Fresnel elements be aligned to a close tolerance. This alignment is especially critical when the groove frequencies of the two surfaces are identical or nearly so.

In practice, however, it is difficult to align two dies in a conventional compression molding operation to maintain the center alignment required to eliminate Moire interference. However, it has been found that by controlling the groove frequency ratio between the two elements, the Moire interference patterns can be reduced to a negligible intensity, even when the centers are not aligned. Specifically, It has been discovered that this occurs when the groove frequency of one grooved surface is at least four times that of the other, and is not an integral multiple thereof. This groove frequency relationship can be satisfied by using either a constant or variable groove width for each surface.

EXAMPLE

A specific design example is now given for the duel grooved Fresnel lens 10 for use in an overhead projector. The groove angles of the Fresnel elements 12 and 14 on each surface are described concisely by the following equation, which is derived from the sag equation of a general aspheric surface:

$$\text{Tangent}(\alpha) = \frac{2YC}{1 + \sqrt{1 - (K+1)C^2Y^2}} + \frac{(K+1)C^3Y^3}{\sqrt{1-(K+1)C^2Y^2}\,[1+\sqrt{1-(K+1)C^2Y^2}\,]^2} + 4dY^3 + 6eY^5 + 8fY^7 + 10gY^9 \qquad (3)$$

where:
  $Y$ = distance from lens center to groove center
  $\alpha$ = angle of an individual groove relative to the plane of the lens
  $C$ = vertex curvature
  $K$ = conic constant
  $d, e, f, g$ = aspheric deformation coefficients The dual-grooved Fresnel lens 10 for use in overhead projection has an effective focal length of 182.5 mm and a clear aperture of 350 mm. The groove frequency of each surface is usually between two and eight grooves per millimeter, and the Fresnel lens material is often optical acrylic plastic. In order to minimize the Moire fringe patterns, the groove frequency ratio between the Fresnel elements 12 and 14 of the two grooved surfaces should be maintained such that one is at least four times that of the other, and is not an integral multiple thereof. In practice, a groove frequency ratio of about 4.74 has been found to be effective. If each surface has a variable groove width, then this ratio must be maintained for each upper/lower surface groove pair.

The groove profile parameters for the surface 12 are:
$C = 0.00521682$ mm$^{-1}$
$K = -1.87385$
$d = -2.87E - 9$
$e = 2.59E - 14$
$f = -1.53E - 19$
$g = 4.40E - 25$ The groove profile parameters for the surface 14 are:
$C = 0.00598319$ mm$^{-1}$
$K = -1.344788$
$d = -4.56E - 9$
$e = 3.47E - 14$
$f = -2.18E - 19$
$g = 8.40E - 25$ The lens material is optical acrylic plastic, having a refractive index, $n_d$, of 1.491 for yellow light.

I claim:

1. An improved dual-grooved Fresnel lens wherein a single sheet of lens material includes grooved Fresnel elements on each major surface, the improvement comprising:

the groove frequency of the Fresnel elements on one major surface of said lens is at least four times the groove frequency of the Fresnel elements on the other major surface of said lens and not an integral multiple of the groove frequency of said Fresnel elements on said other major surface, whereby Moire fringes are reduced.

2. An improved dual-grooved Fresnel lens according to claim 1 wherein said groove frequency of said Fresnel elements on said one major surface is about 4.74 times the groove frequency of said Fresnel elements on said other major surface.

3. An improved dual-grooved Fresnel lens according to claim 1 wherein the groove width of the Fresnel elements on each major surface of said lens is variable.

* * * * *